Oct. 10, 1944.   J. URBAS ET AL   2,360,179
OIL BURNER CONTROL AND APPARATUS THEREFOR
Filed Aug. 1, 1942   2 Sheets-Sheet 1

INVENTORS
JOSEPH URBAS
CHARLES BIVONA
BY
their ATTORNEY

Oct. 10, 1944.   J. URBAS ET AL   2,360,179
OIL BURNER CONTROL AND APPARATUS THEREFOR
Filed Aug. 1, 1942   2 Sheets-Sheet 2
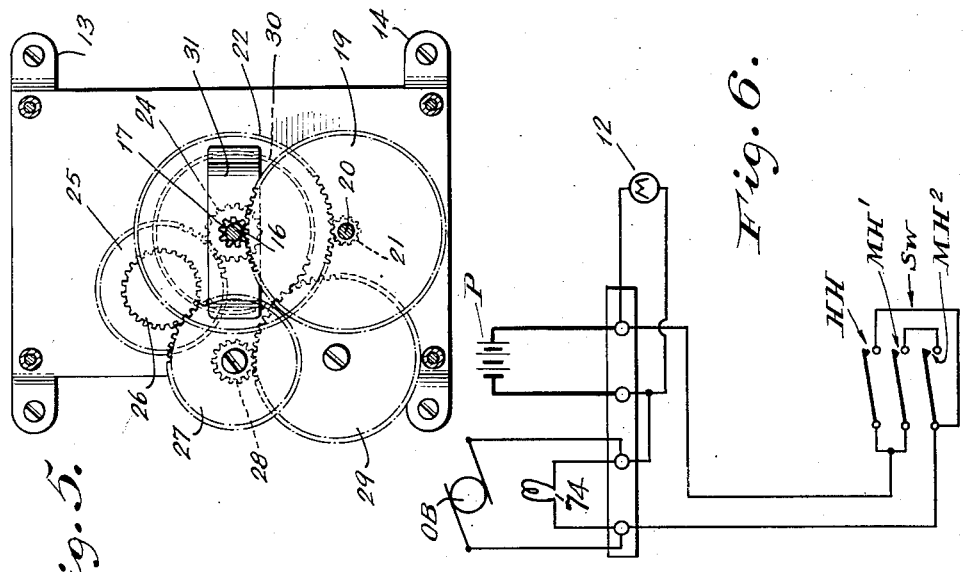
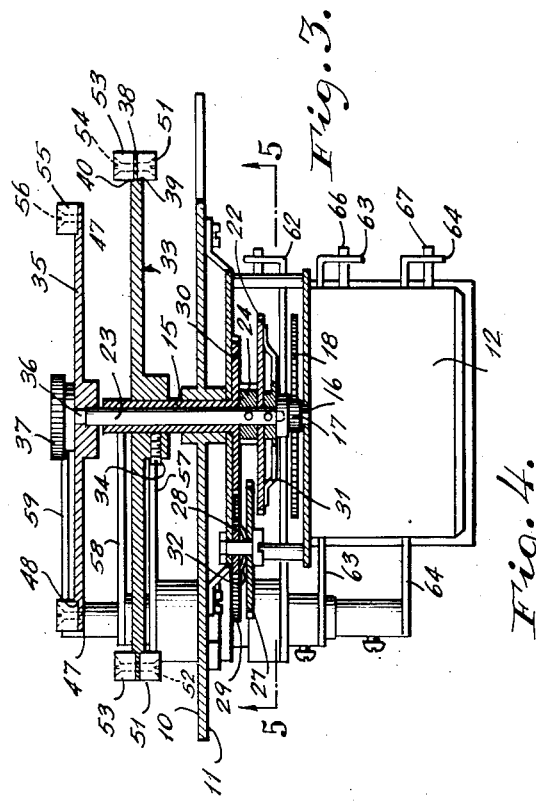
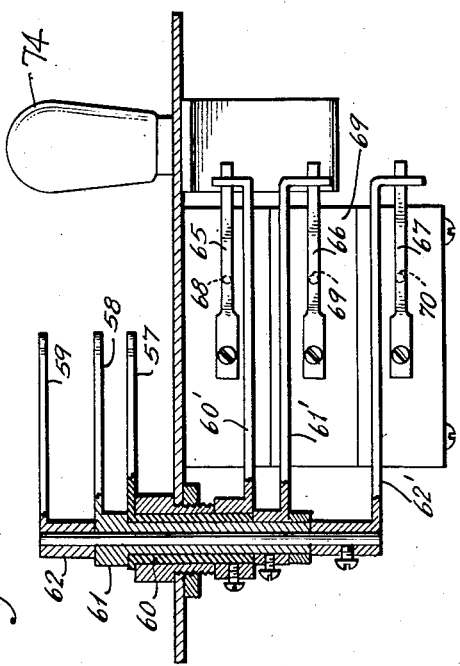
INVENTORS
JOSEPH URBAS
CHARLES BIVONA
BY
J.F. Basseches,
their ATTORNEY Patented Oct. 10, 1944

2,360,179

UNITED STATES PATENT OFFICE 2,360,179

OIL BURNER CONTROL AND APPARATUS THEREFOR

Joseph Urbas, New York, and Charles Bivona, Brooklyn, N. Y.

Application August 1, 1942, Serial No. 453,240

3 Claims. (Cl. 200—38)

This invention relates to mechanism for controlling the electric current supply for fuel burners which, by this arrangement, may effect great economies in fuel and which may distribute the heat during operation efficiently under conditions where thermostatically controlled apparatus has been found to be valueless.

Still more particularly, our invention relates to mechanism for controlling the operation of the furnace in large apartment houses and office buildings, where the heat feed is of importance, and is not susceptible of thermostatic control because of the heat requirements in the various units or apartments throughout a building of such character.

More specifically, our invention relates to, and it is an object of our invention to provide, mechanism wherein fuel consumption for heating purposes in large buildings may be distributed during the 24 hour day to effect a predetermined economy depending upon the allotment of fuel which may be made available, thereby to secure the most effective heating results for comfort and hot water requirements. Thus, in accordance with our invention, a 10 to 50% reduction of allotment of fuel in the form of oil or the like, which is subject to automatic control, may be distributed most efficiently over the operating day while controlling the fuel consumption in accordance with the reduced allotment.

We have found that by a clock controlled electrical switch, the electrical supply to the oil burner or like operated furnace may be switched on or off, in accordance with empirically determined fractionation and without regard to thermostatic control, to effect substantial economies in fuel consumption and to make it possible to effect any percentage of economy while distributing the available fuel over a twenty-four hour day operation, to secure a predetermined economy with the least amount of disturbance in the relative efficiency of heat distribution.

The attainment of the foregoing objects and such further objects as may appear herein or be hereinafter pointed out will become more apparent as this description proceeds, by reference to the accompanying drawings forming a part hereof, wherein—

Figure 3 is a section taken on the line 3—3 of Figure 2;

Figure 4 is a section taken on the line 4—4 of Figure 2;

Figure 5 is a plan view showing the gear train;

Figure 6 is a diagrammatic view of the wiring.

Figure 2:
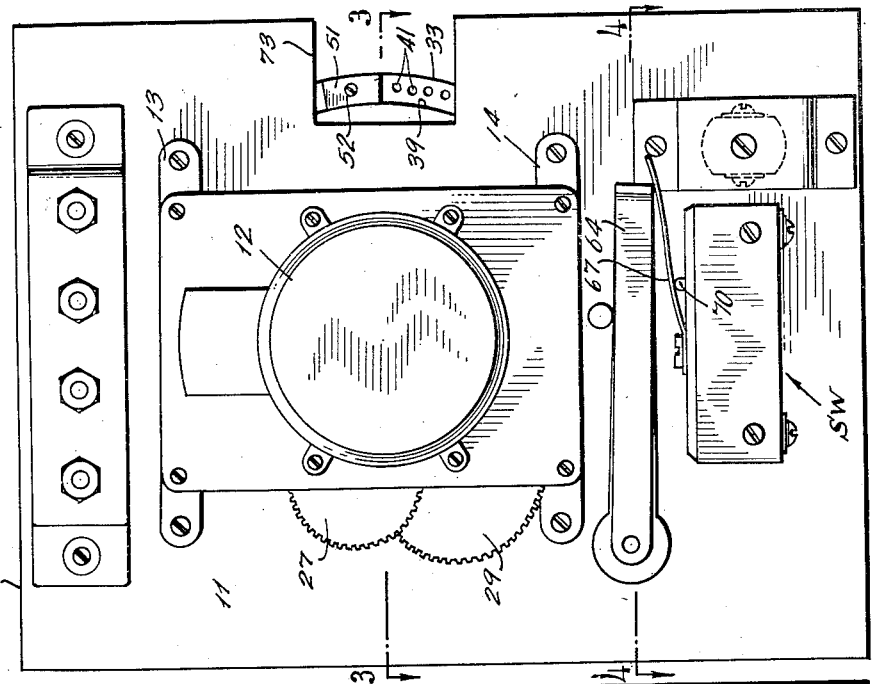
Figure 2 is a rear view of the same.

Making reference to the drawings, Figure 6 diagrammatically shows the circuits by which power from the source P is supplied to the oil burner motor assembly OB by the switch mechanism SW, whose condition is controlled by the clock motor M.

In accordance with our invention, by reference to the wiring diagram of Figure 6, an electrically controlled clock motor M operates dials, more specifically referred to hereinafter, whereby the switch SW is predeterminedly opened or closed during definite intervals of time, empirically determined to turn on and off the oil burner motor assembly OB.

In accordance with our invention we have found that the maintenance of the oil burner in large buildings, such as apartment houses and office buildings is best secured without any thermostatic control. The requirements of a multiple dwelling house, such as an apartment or office building, as to its heating, hot water and steam requirements, are most economically satisfied by experimental observation. With due regard to outside temperatures, rising time of tenants, the time of occupancy, material economies in oil consumption may be effected, without sacrifice of comfort, by alternation of the heat supply—in the case of an oil burner, by alternation of the time when the oil burner is on or off.

In accordance with a typical illustration for the operation of a ten story apartment house which is equipped to supply steam for heating the building, hot water supply and steam for the laundry, empirical determination has taught us that the following program may be maintained. With an outside temperature of about 40° F., the oil burner is arranged to start about 6 a. m., to run continuously to about 7:30 a. m. This may be referred to as a "constant heat period."

From 7:30 a. m. until 5 p. m. the operation may include alternate periods of heat maintenance and discontinuance of heat. This period of time may be referred to as a "heat boosting period."

Thereafter for another short period, say from 5 p. m. to 6 p. m. a constant heat period may be availed of.

From 6 p. m. to 10 p. m another heat boosting period may be maintained.

From 10 p. m. to 6 a. m. a "shut-off" period may be maintained.

During the heat boosting period, alternations in which the on period and off period vary in length of time may be maintained—for example, from 7:30 a. m. to 8:30 a. m., the alternations may be one half hour "shut-off" and one half hour "on"; from 8:30 to 5 p. m. the alternations may be three quarters of an hour off and one quarter of an hour on.

By being able predeterminedly to alternately fractionate the "heat boosting periods" to vary the length of time in the intervals in the heat boosting period, we are enabled predeterminedly to effect any desired economy of fuel consumption, while efficiently distributing the heat.

Thus, in accordance with the device hereinafter more specifically described, variations in temperature which may make it desirable to increase the period of duration when the oil burner is "on" during the alternate fractionation of the heat boosting period or where, by reason of fuel allotments a predetermined economy must be effected in fuel consumption, our device makes it possible indiscriminately to alternate and fractionate any heat boosting period.

Our device has as its novel features a flexibility of adjustment of the device in order to ascertain:

1. The extent and duration of constant heat period;
2. The extent, nature and operation of the heat boosting period;
3. The extent, nature and operation of the shut off period.

Our device hereinafter to be described is characterized by its amenability to the increase in the duration of time when the oil burner is "on" during the constant heat period or during the "heat boosting period" by devising a time controlled switch in which continuity of operation may be secured. Thus, by the device hereinafter described, after ascertaining empirically the duration of any constant heat period, increase may be made of the duration of the constant heat period as part of a studied program to ascertain the formula peculiar to the dwelling under consideration.

Likewise, in accordance with the device hereinafter described, we are enabled to vary the alternations during the heat boosting period to increase and decrease the duration of the "on" time or "shut-off" time during the alternation.

By reference to Figure 6, there is shown in this diagram an hour hand switch HH and a pair of "set-up" switches MH1 and MH2. Clock or time control of the switch HH is in accordance with the movement of an hour hand dial. Clock control of the minute hand switches MH1 and MH2 is controlled by an interrelation of a minute hand dial to an hour dial. The hour hand switch HH is intended, in accordance with our invention, to be operated alternately with the setup switches MH1 and MH2. The hour hand switch HH is intended to function during a constant heat period or shut-off period. The "set-up" switches MH1 and MH2 function together, preferably during heat boosting periods.

Figure 1:
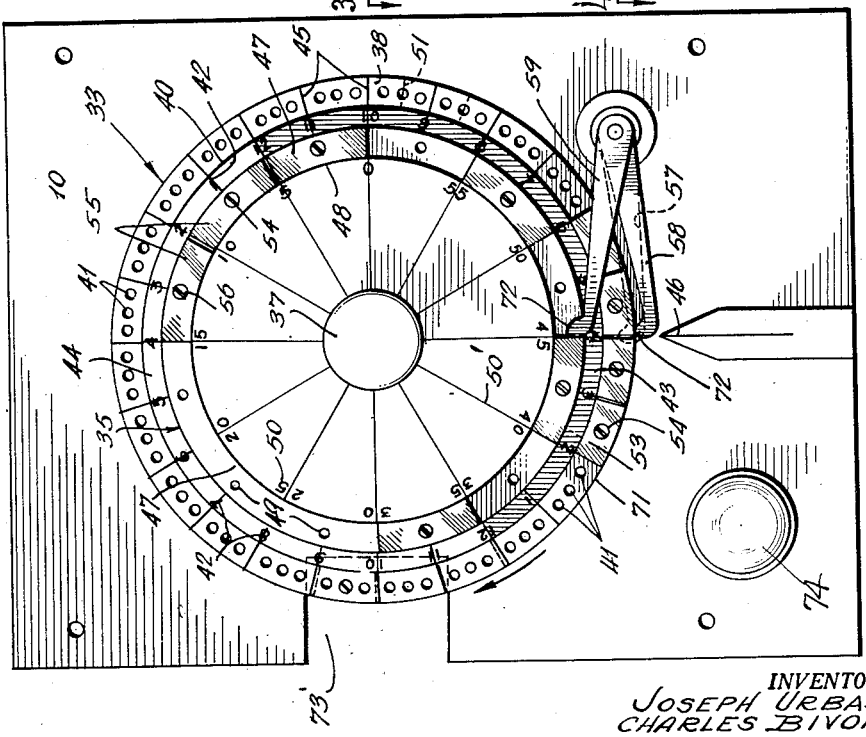
Figure 1 is a face view of the control panel and dials.

Making reference to Figure 1, we show a panel 10, on the back 11 of which is mounted the clock motor 12 by suitable brackets 13—14. The clock motor is preferably of a kind timed to provide the shaft 15 with one revolution in twenty four hours, which is secured by the gear train, shown in Figures 3 and 5.

The clock motor shaft 16 has the gear thereof 17 meshed with the gear 19 mounted upon the shaft 20, from which the gear 21 drives the gear 22, upon which the minute hand shaft 23 is mounted.

From the minute-hand shaft gear 24, take-off gears 25, 26, 27 and 28 transmit movement by the idler 29 to the hour hand gear 30, upon which is mounted the hour shaft 15.

We prefer to provide a friction clutch coupling between the minute hand gear 22 and the minute hand shaft 23 and for this purpose a friction clutch 31 is keyed to the minute hand shaft 23, and frictionally engages the face of the minute hand gear 22.

Likewise, the gear 28, which drives the hour hand gear 30, includes a friction clutch 32.

With this assembly thus provided, we mount upon the hour hand shaft 15 a dial 33, keying the same to the hour hand shaft 15 by the set screw 34. Mounted upon the minute hand shaft 23, we provide the minute hand dial 35. This is suitably orificed to connect the same with the splined portion 36, to which the dial 35 is held by the set screw 37.

The hour hand dial 33 is formed adjacent its peripheral edge with a flange 38, defining shoulders 39 and 40, concentric with the periphery.

The flange 38 is formed with spaced attaching orifices 41, which are arranged preferably in intervals corresponding to fifteen minutes. Numerical indicia 42 are provided below the shoulders 40, providing the same progressively between the hours one to twelve, the post-meridian period being made more distinctive by painting the section 43 in black, while providing the section 44 in a light color, to indicate the ante-meridian or forenoon period, or any other convenient contrast between these periods may be effected.

Radial markings 45 facilitate reading of the indicia on the dial in reference to an indicator or pointer 46.

The minute hand dial 35 is formed with a flange 47, defining a shoulder 48. This shoulder 48 is concentric with the periphery of the dial. The flange 47 is provided with equi-distantly spaced orifices 49 corresponding to five minute intervals, indicia 50 numerically indicating the five minute intervals, totalling one hour from 5 to 60 are shown.

Radial markings 50' are of assistance in reading of the dial, as will be readily understood.

The flange 38 may have mounted adjacent the rear face a plurality of predeterminedly selected tripping blocks 51 which are formed to abut the shoulder 39 and held in position by readily disengageable fastening means 52 entering the orifices 41 formed in the flange 38.

Screws are shown for this purpose, though it will be understood that other rapid means may be employed to attach or detach the tripping blocks 51.

The front face of the hour hand dial 33 may have mounted upon the flange 38 a series of segmental tripping blocks 53, held in position by fastening elements 54, for purposes which will appear more clearly, as this description proceeds.

The minute hand dial 35 may have affixed adjacent the flange 47 tripping blocks 55, held in position by fastening means 56, engaging the orifices 49.

Disposed in the path of the tripping blocks 51, 53 and 55, we provide tripping fingers 57, 58 and 59 operating through shafts 60, 61 and 62 respectively, to the rear face 11 of the panel 10, to manipulate the fingers 60', 61' and 62' which engage the spring leafs 65, 66 and 67, respectively, of the microswitches 68, 69 and 70. The microswitches which we have employed successfully are those made under the patent to McGall, 1,960,020.

Tripping finger 57 serves to operate the microswitch 68 corresponding to the hour hand switch HH, previously described.

Tripping fingers 58 and 59 operate microswitches 69 and 70, corresponding to the minute hand switches MH1 and MH2, previously described.

With the construction as provided, the hour hand dial has attached to it onto the flange 38 and in contact with the shoulder 39, a series of tripping blocks 51 to provide the means for actuating the tripping finger 57 for the constant heat period. These blocks may be of segments to cover an hour period and may be spaced from each other, or continuous, depending upon the chosen period for the constant heat period.

By making the tripping blocks of a form to have the edge 71 thereof arcuately to conform to the periphery of the dial, the tripping fingers will be continuously tripped when the edges 71 contact the camming portions 72, formed on any one of the tripping fingers 57, 58 and 59.

The flange 38 on its front face adjacent the shoulder 40 is formed to receive the tripping blocks 53. These are spaced within a period of time which has been referred to as the heat boosting period. These blocks 53 may be spaced to cover segments of a period of time of one hour or any fraction thereof, but preferably are arranged continuously to form one continuous peripheral surface between such period of time known in advance to be subject to a heat boosting period. The tripping blocks 53 are ineffective in their action upon the tripping finger 57, unless the tripping finger 59 is likewise tripped. For this purpose, the minute hand dial is provided with the tripping blocks 55 which actuate the tripping finger 59.

Upon rotation of the hour hand dial 33 to bring in position the tripping blocks 53 in contact with the tripping finger 58 opposite the index point 46, and at the same time the minute hand dial 35 brings into position the tripping blocks 55, the circuit will be closed to provide power to the oil burner OB in that the set-up switches corresponding to MH1 and MH2 (Figure 6) will be simultaneously closed.

When tripping blocks 53 are provided on the front face of the dial 33, it will be understood that tripping blocks 51 will be omitted in the corresponding segment on the rear face of the hour hand dial 33.

The tripping blocks which are provided on the minute hand dial 35 may be sectionalized to cover five minute intervals or any fraction thereof and be spaced from each other to give alternations of five minutes of depression of the tripping finger 59 or five minutes rise of this finger.

If during this period of time the tripping blocks 53 are present adjacent the point 46 to set up the tripping finger 57, it will be understood that the oil burner OB will be turned on and off as the tripping blocks 55 actuate the finger 59. If the tripping blocks 53 are arranged sequentially to correspond to a heat boosting period, it will be observed that as the minute hand dial 35 rotates, fractionated periods of heat will be secured as the oil burner OB is turned on or off. By spacing the tripping blocks 55 on the minute hand dial 35, an alternation may be secured during the heat boosting period to suit any desired alternation; that is, the switches may be closed 5 minutes and open 5 minutes, or the switch may be closed during a fifteen minute interval, followed by fluctuations of five minutes on and five minutes shut-off.

Should it be determined during the heat boosting period that the alternations as determined by the tripping blocks 55 on the minute hand dial 35 are inadequate, one or more five minute blocks may be affixed in position and the alternations modified and the hour cycles varied at will. Likewise, if it is desired, to effect a predetermined saving of oil, due to the necessity of staying within allotted requirements of fuel consumption, such as may be found during the war period, the tripping blocks 55 of the minute hand dial may be of such extent and spacing to effect that purpose, while still distributing the alternations during the heat boosting period.

For example, if the heat boosting period is between the hours of 12 noon and 6 in the afternoon, a series of tripping blocks 53 are disposed upon the flange 38 on the front face of the hour hand dial 33 to correspond to those hours in contiguous relationship. The minute hand dial has the blocks 55 mounted thereon, for example, to provide alternation of periods of fifteen minutes on and fifteen minutes off, and then alternations of five minutes off and five minutes on for the remainder of the hour. This will effect an economy of fifty per cent (50%) during every hour interval. Should a further economy be necessary during the heat boosting period, the tripping blocks 55 may be made to cover intervals of four minutes instead of five minutes. This will give alternations of longer period of shut-off as compared with the period when the OB is on while distributing the heat boosting period not to excessively heat during any particular period.

Fractionation may by this construction be modified at will during the heat boosting period in a very simple way while securing precision in the fuel consumption in that the alternations may be made of any prescribed duration of time as to the "on" or "shut-off" time. In this manner, particularly during the heat boosting period, any predetermined economy may be effected, depending upon the allotment of fuel made. Likewise, facile adjustment may be made upon the readily accessible minute hand dial 35 to add or remove the tripping blocks 55 or arrange them in such alternation, especially during the heat boosting period, to secure a fractionation of time as may be found desirable or expedient.

The operation of the oil burner may be noted by the signal light 74 wired in parallel with the oil burner OB.

Where it may be found desirable to alternate the operation of the oil burner during the constant heat period, the tripping blocks 51 may be arranged on the flange 38 on the rear face thereof in spaced positions on the periphery. The adjustment of these blocks may be facilitated by the cutout portion 73 formed in the panel.

While it is known to us to provide electric time switches, no one has heretofore provided the flexibility of adjustment of our device whereby alternate fractionation of any period of time may be secured as desired, and while the time controlled mechanism is in operation.

The provision of friction clutches in the mechanism as described by us makes it possible to fractionate the alternations of any period of time quickly and facilely.

Thus, by our construction, a wide variety of changes in fractionating intervals may be secured empirically to determine the duration of the constant heat period, or the shut-off period or the duration of time during the heat boosting period when there are alternate intervals when the heat is on or off as determined by a predetermined plan for the consumption of fuel.

In general, we have provided an oil burner control of simple and inexpensive construction whereby fuel conservation is possible while automatically satisfying the critical requirements of the tenants for heat, hot water, steam, etc. in large dwellings.

While we prefer to utilize our invention in its entirety, novelty is considered to reside in parts thereof as may be pointed out in the appended claims.

Having thus described our invention and illustrated its use, what we claim as new and desire to secure by Letters Patent is:

1. A time controlled switch assembly for an electrical circuit comprising, in combination contact means controlled by a tripping finger, a clock rotated dial having a gear train to provide one revolution of the dial in twenty-four hours, camming means on said dial, a minute hand dial operated by a gear train connected with said clock to provide one rotation per hour, means to mount finger tripping blocks on said first and second dials cooperating with each other alternately to fractionate any period of time controlled by said first dial.

2. A time controlled switch assembly for an electrical circuit comprising, in combination contact means controlled by tripping fingers, clock rotated dials having camming means for said tripping fingers of said dials, the first dial being operated on a train to provide one revolution per day, the second dial being connected with the train for securing one revolution per hour, a friction clutch between said clock controlled mechanism and said minute hand dial whereby camming means on said minute hand dial may be moved alternately to fractionate any interval of time controlled by said hour hand dial.

3. A time controlled switch assembly for an electrical circuit, the combination comprising contact means controlled by tripping fingers, a clock rotated hour hand dial and a minute hand dial, each having camming means for said tripping fingers, including means for removably mounting spaced arcuate tripping blocks contoured to have a plurality of the same provide a continuous camming surface, or to provide alternating portions to open and close the electrical circuit in accordance with the spacing of said tripping blocks, said hour hand dial being formed to mount to the front and back faces various sizes of said blocks, the front face blocks of said hour hand dial providing means operating a tripping finger set-up to be effective by another tripping finger controlled by the minute hand dial, whereby a predetermined boosting period outlined by the tripping blocks on the front face of the hour hand dial may be alternately fractionated by the minute hand dial, the back face blocks providing means for operating a tripping finger effective to provide a constant period independently of the minute hand dial.

JOSEPH URBAS.
CHARLES BIVONA.